UNITED STATES PATENT OFFICE.

JOHN E. YOST, OF ARKANSAS CITY, KANSAS.

DRY YEAST COMPOUND.

941,221.  Specification of Letters Patent.  Patented Nov. 23, 1909.

No Drawing.   Application filed February 5, 1909.   Serial No. 476,312.   (Specimens.)

*To all whom it may concern:*

Be it known that I, JOHN E. YOST, a citizen of the United States, and a resident of Arkansas City, in the county of Cowley and State of Kansas, have invented a new and Improved Dry Yeast Compound, of which the following is a full, clear, and exact description.

My invention relates to yeast compounds, my more particular purpose being to provide a carrier for certain yeast compounds originally prepared in the form of a liquid and afterward dried.

More particularly stated, my invention comprehends the preparation of an inert, light, harmless and cheap substance reduced to comminuted or powdered form, and so treated that each particle of it in such form receives an individual thin coating of the baking compound to be carried, the inert substance thus performing the office of a carrier and also increasing the bulk of the baking compound which might otherwise occupy such a small volume that its measurement and application would be rendered difficult, the inert substance in question serving further as an absorbent for the liquid content and the baking compound when first prepared.

I have made the discovery that vegetable pith, and particularly the pith taken from between the joints of corn stalks, if comminuted or powdered and thus reduced to the consistency of meal, forms a light body having a relatively large capacity for holding a yeast compound. This capacity seems to be somewhat independent of the capacity of the meal considered as an absorbent. That is to say, each separate particle of the meal serves as a carrier and is practically coated entirely over its exterior substantially with the yeast compound which is at first in the form of a liquid, so that each particle of the meal is thus coated superficially with the yeast compound, any residual moisture being taken up by absorption in the particles of pith. I have also made the discovery that the yeast compound, if subjected to certain steps hereinafter described, is rendered more suitable for coating upon the particles of pith meal.

I proceed as follows, using the different substances in the stated proportions by weight: I select raw Irish potatoes 15 parts, water 80 parts, sugar 3 parts, salt 1 part, and yeast 3 parts. I grind the potatoes fine and with the water I wash out the starch from the potatoes. I next boil the water containing the starch until the starch breaks up and acquires a jelly-like consistency, appearing somewhat as if cooked in the potato. I next add the sugar and salt, and allow the mass to cool to a temperature of 80 degrees Fahrenheit. I next add the yeast and allow the material to ferment for a period of 24 hours. During this time the larger and better portion of the yeast compound settles to the bottom of the vessel, and I thereupon pour off the upper part which is easily separated and has, of course, a liquid form. The part remaining—that is, the comparatively solid part of the mass—is what I use in carrying out my invention. I next prepare a quantity of pith meal made preferably from the pith of corn stalks and reduced, by grinding, beating, grating or otherwise, to the form of meal. I add this meal to the residual composition above described, the proportion of the meal being such that when mixed with the composition the resulting composite substance may be readily formed into cakes or crumbs. These are placed on trays and allowed to dry, and when completed are packed in boxes or packages ready for the market.

The completed article consists essentially of fine particles of composite character, each particle having a center or nucleus of pith and an outer coating of the yeast compound. Any moisture in the compound thus applied is readily taken up by absorption by the pith and soon dries out.

The principle above described may be employed in treating yeast compounds of any kind. That is to say, such yeast compounds may be applied to pith meal in such manner that each particle of the meal is coated with the yeast compound.

By pursuing the steps above stated, any yeast compound can be placed in such form that the quantity of the compound is easily measured or apportioned, by merely using a given volume or mass of the completed product. That is to say, the yeast compound is difficult to measure or to weigh if it is concentrated or condensed beyond certain limits. It is easier to measure or to weigh accurately if it contains some sort of inert dope or carrier which gives it body.

Having thus described my invention, I claim as new and desire to secure by Letters Patent:

The product herein described, consisting of vegetable pith, and a yeast compound, said vegetable pith being in the form of small particles and said yeast compound being coated superficially upon said particles.

In testimony whereof I have signed my name to this specification in the presence of two subscribing witnesses.

JOHN E. YOST.

Witnesses:
H. E. LEASURE,
J. E. ROSEBERRY.